Patented Apr. 14, 1936

2,037,658

UNITED STATES PATENT OFFICE 2,037,658

SPRAY MATERIAL

John W. Roberts, Washington, D. C., dedicated to the free use of the People of the United States No Drawing. Original application September 16, 1932, Serial No. 633,465. Divided and this application December 30, 1935, Serial No. 56,716

1 Claim. (Cl. 167—14)

(Granted under the act of March 3, 1883, as amended April 30, 1928; 370 O. G. 757)

This is a division of my former application filed September 16, 1932, bearing Serial No. 633,465.

This application is made under the act of March 3, 1883, as amended by the act of April 30, 1928, and the invention herein described may be manufactured and used by or for the Government for governmental purposes without the payment to me of any royalty thereon.

I hereby dedicate the invention herein described to the free use of the People of the United States to take effect on the granting of a patent to me.

In my Patent No. 1,791,430, a mixture of zinc sulphate and lime, to which other substances may be added to increase sticking and spreading properties as described. This fungicide and bactericide is successfully used for protecting plants from the attacks of certain parasitic organisms.

My new invention pertains to a zinc nitrate and lime spray, as follows:

Compounds of zinc other than the sulphate of zinc may be used with lime in making up the parasiticide. For example, when zinc nitrate is substituted for zinc sulphate, a mixture, compound or series of compounds is formed which possess parasiticidal properties and which is non-injurious or even stimulative to plants to which it is applied.

For example, when four pounds of zinc nitrate and four pounds of hydrated lime (calcium hydroxide) are mixed together in fifty gallons of water and applied to peach or apple trees, the trees so treated are protected from the invasion of parasitic organisms and the leaves, fruits, and other parts of the tree remain healthy and vigorous. When a tree or part of a tree is so treated the treated tree or part may be so affected as to show health and vigor noticeably greater than the nontreated, in addition to health and vigor brought about by the protective action against the invasion of parasitic organisms.

Having thus fully described my invention, what I claim for Letters Patent is:

A plant spray comprising zinc nitrate and lime.

JOHN W. ROBERTS.